Patented July 20, 1926.

1,593,080

UNITED STATES PATENT OFFICE.

HANS JORDAN, OF BERLIN-STEGLITZ, GERMANY, ASSIGNOR TO THE FIRM: CHEMISCHE FABRIK AUF ACTIEN (VORM. E. SCHERING), OF BERLIN, GERMANY.

DIHYDROXY DIPHENYL METHANE COMPOUNDS.

No Drawing. Application filed September 8, 1925, Serial No. 55,152, and in Germany September 20, 1924.

My invention refers to new chemical products and to the process of making same. It more particularly relates to hydrogenated dihydroxy diphenyl methane compounds corresponding to the formula

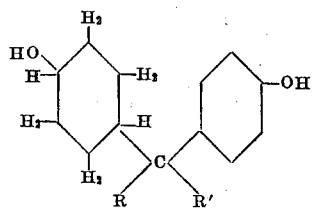

wherein R and R' can be either two identical or two different alkyl or aryl radicals. The term "phenyl" is meant to comprise also the ortho-alkyl substitution products of phenol such as for instance ortho cresol, so that the above formula is meant to comprise also compounds corresponding to the formula

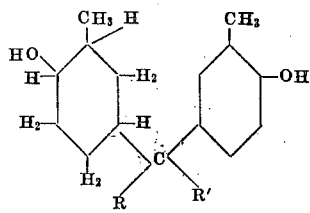

The new compounds are useful for therapeutical as well as for technical purposes and, being themselves capable of manifold conversions, can also be utilized as intermediate products for therapeutical and technical preparations. They have the form of highly viscous bodies solidifying in the cold and having high boiling points. They are prepared by acting with hydrogen in the presence of a catalyst on condensation products from ketones and phenols (incl. the ortho alkyl substitution products of phenols) until 6 atoms of hydrogen have entered into combination. As a catalyst I employ for instance nickel, colloidal palladium or platinum black.

In practising my invention I may proceed for instance as follows:

*Example 1.*—100 parts by weight of para dihydroxy diphenyl dimethyl methane, being a condensation product from acetone and phenol (Berichte der Deutschen Chemischen Gesellschaft 25, page 334, Abstracts) are mixed with 5 parts of a nickel catalyst and are treated with hydrogen at 170–180° C. in an autoclave at a pressure of 10–15 atoms. When 6 atoms of hydrogen have entered into combination the reaction is interrupted and the isolated product is 4-hydroxy cyclohexanyl para hydroxyphenyl dimethyl methane, which boils at 213° C. under a pressure of 0,8 mms. and solidifies in the cold, forming a limpid mass being substantially similar to glass.

*Example 2.*—100 parts by weight of 4-dihydroxy-3-dimethyl diphenyl dimethyl methane (see p. 24 of Unverzagt's dissertation published in 1904 at Marburg and entitled "Ueber die Einwirkung von Brom auf Di-para-oxytolyl-dimethylmethan") are treated with hydrogen under pressure in an autoclave at 150–170° in the presence of 2–5 parts of a nickel catalyst. When the reaction is interrupted after 6 atoms of hydrogen have entered into combination, there is obtained 4-hydroxy-3-methyl cyclo hexanyl-4-hydroxy-3-methyl phenyl dimethyl methane, which boils under a pressure of 0,8 mms. at 218° and solidifies in the cold forming a mass having the hardness of glass.

I wish it to be understood that the production of the new compounds is not limited to the exact proportions and operations described, for obvious modifications will occur to a person skilled in the art.

I claim:—

1. As a new product, a hydrogenated dihydroxy diphenyl methane compound corresponding to the formula

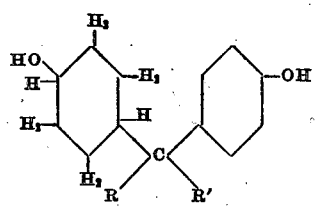

wherein R and R' are two identical or two different alkyl or aryl radicals and wherein the ortho-positions relative to the hydroxyl group can also be taken up by alkyl radicals.

2. As a new product, a para hydrogenated dihydroxy diphenyl dimethyl methane compound corresponding to the formula

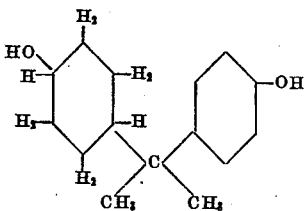

wherein the ortho-positions relative to the hydroxyl group can also be taken up by alkyl radicals.

3. As a new product, 4-hydroxy-3-methyl-cyclohexanyl-4-hydroxy-3-methylphenyl dimethylmethane corresponding to the formula

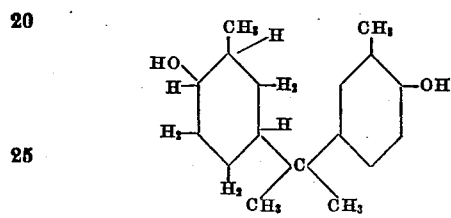

this compound boiling at 218° under 0,8 mms. pressure and solidifying in the cold, forming masses having a resemblance to glass.

4. The process of producing hydrogenated dihydroxy diphenyl methane compounds comprising acting with hydrogen in the presence of a catalyst on a condensation product from a ketone and a phenol until 6 hydrogen atoms have entered into combination.

5. The process of producing hydrogenated dihydroxy diphenyl methane compounds comprising acting with hydrogen in the presence of a catalyst on a condensation product from acetone and a phenol until 6 hydrogen atoms have entered into combination.

6. The process of producing hydrogenated dihydroxy diphenyl methane compounds comprising acting with hydrogen in the presence of a catalyst on a condensation product from acetone and ortho cresol until 6 hydrogen atoms have entered into combination.

7. The process of producing hydrogenated dihydroxy diphenyl methane compounds comprising acting with hydrogen in the presence of a nickel catalyst under pressure at a temperature of 150–170° on a condensation product from acetone and ortho cresol until 6 atoms of hydrogen have entered into combination.

In testimony whereof I affix my signature.

HANS JORDAN.